United States Patent
Setzer, Jr. et al.

(10) Patent No.: US 7,870,629 B2
(45) Date of Patent: Jan. 18, 2011

(54) PORTABLE DOCKING STATION

(76) Inventors: Mitchell Olin Setzer, Jr., 3645 Mabel La., Lenoir, NC (US) 28645; Mitchell Olin Setzer, Sr., 3645 Mabel La., Lenoir, NC (US) 28645; Larry Richard Setzer, Jr., 1646 Husband Creek Rd., Lenoir, NC (US) 28645; Larry Richard Setzer, Sr., 1646 Husband Creek Rd., Lenoir, NC (US) 28645

( * ) Notice: Subject to any disclaimer, the term of this patent is extended or adjusted under 35 U.S.C. 154(b) by 0 days.

(21) Appl. No.: 12/485,880

(22) Filed: Jun. 16, 2009

(65) Prior Publication Data

US 2009/0307853 A1    Dec. 17, 2009

Related U.S. Application Data

(60) Provisional application No. 61/061,729, filed on Jun. 16, 2008.

(51) Int. Cl.
*E01D 1/00* (2006.01)
(52) U.S. Cl. ............................ 14/69.5; 14/71.3; 14/72.5
(58) Field of Classification Search .................. 14/69.5, 14/71.5, 72.5; 182/1
See application file for complete search history.

(56) References Cited

U.S. PATENT DOCUMENTS

| | | | | | |
|---|---|---|---|---|---|
| 2,512,150 | A | * | 6/1950 | Geren | 92/18 |
| 2,969,123 | A | * | 1/1961 | Jamerson et al. | 182/116 |
| 4,517,698 | A | * | 5/1985 | Lamp'l et al. | 14/72.5 |
| 4,768,617 | A | * | 9/1988 | Mason et al. | 182/1 |
| 5,105,915 | A | * | 4/1992 | Gary | 187/200 |
| 6,962,233 | B2 | * | 11/2005 | Gillis et al. | 182/15 |
| 6,988,289 | B2 | * | 1/2006 | Pedersen et al. | 14/69.5 |
| 7,069,611 | B2 | * | 7/2006 | Larson | 14/71.3 |

* cited by examiner

*Primary Examiner*—Raymond W Addie
(74) *Attorney, Agent, or Firm*—Monty Simmons; Simmons Patents

(57) ABSTRACT

Disclosed is an apparatus and method for providing a portable docking station function for transferring items. The portable docking station may be suitably sized for the application of interest; however, for the preferred embodiment the portable docking station is about the size of a typical parking space. Embodiments of the invention include devices comprising a ramp with an automatic lowering system, lifting system and electronic modules for performing a variety of functions.

20 Claims, 12 Drawing Sheets

PORTABLE DOCKING STATION

CLAIM TO PRIORITY

This application claims priority to provisional application 61/061,729 filed on Jun. 16, 2008, the entire contents of which are incorporated herein by this reference for all purposes.

TECHNICAL FIELD OF THE INVENTION

The present invention relates to an apparatus and method for providing a portable docking station for transferring items.

BACKGROUND OF THE INVENTION

In the retail environment, there is often a need to transfer items from one place to another. One such situation involves transferring an item form a retail storage area to a transport vehicle used by a customer who has purchased the item. Such can be a problem when the items purchased are heavy and must be lifted to be placed into a transport vehicle. What is needed is a portable docking station that is suitably configured to facilitate the transfer of items from one location to another in the retail environment as well as other environments.

Another problem involves safely transferring items from a first surface to a second surface. Heavy Items present a much higher risk of injury to the mover than do lighter items. What is needed is a portable transfer apparatus comprising a lift feature that will lift heavy items to the height need to transfer the time to a transport vehicle or surface.

Yet another problem associated with all docking systems is security as such system may be used to facilitate unauthorized item transfers. What is needed is a portable docking apparatus as described above comprising electronic features for monitoring the apparatus and its use.

SUMMARY

Some of the objects and advantages of the invention will now be set forth in the following description, while other objects and advantages of the invention may be obvious from the description, or may be learned through practice of the invention.

Broadly speaking, a principle object of the present invention is to provide a portable apparatus for transferring items from a first location at a first elevation to a second location at a second elevation.

Yet another object of the invention is to provide an apparatus for transferring items between a first point at a first elevation to a second point at a second elevation where the apparatus comprises an automatic lowering feature and is suitably configured for being positioned in the parking lot of a retail store environment or other similar environment.

Still another object of the invention is to provide an apparatus for transferring items between a first point at a first elevation to a second point at a second elevation where the apparatus comprises an automatic lowering feature and is suitably configured for being positioned in the parking lot of a retail store environment or other similar environment and further suitably configured for providing a lifting feature.

Yet another object of the invention is to provide an apparatus for transferring items between a first point at a first elevation to a second point at a second elevation where the apparatus comprises electronic monitoring features including visual signaling components, audio signaling components, monitoring components, and communications features.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
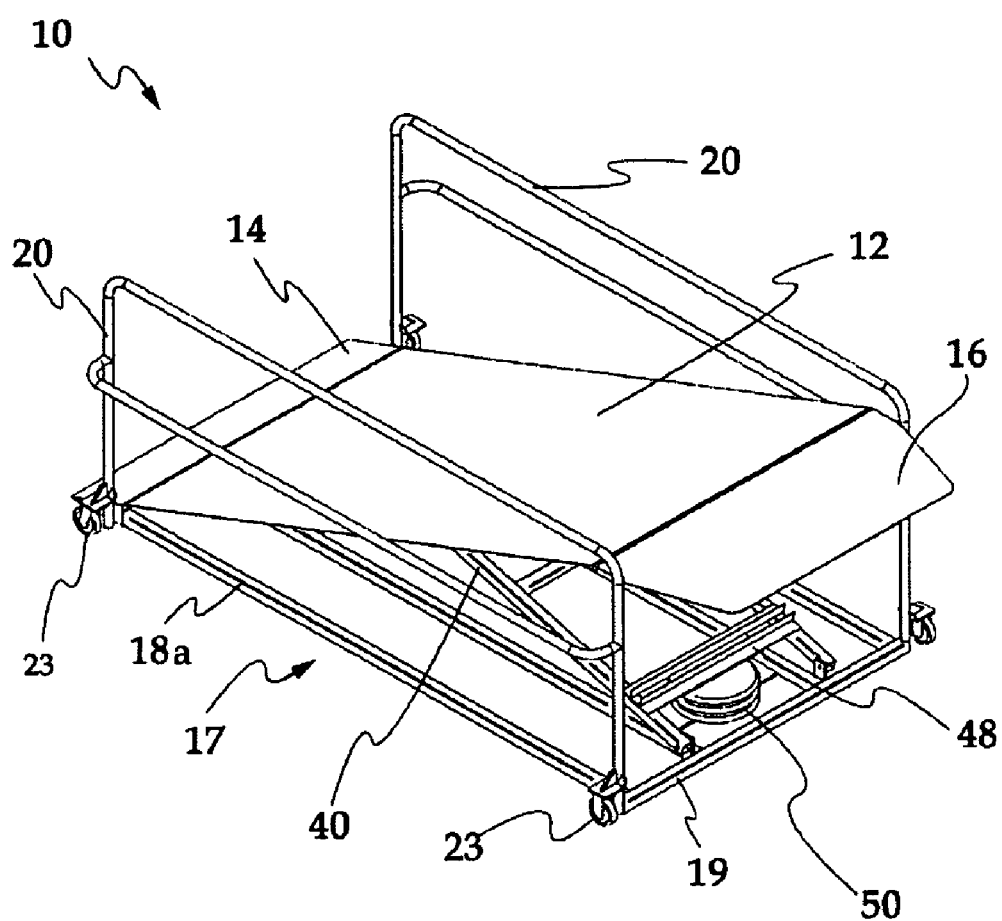
FIG. 1 is a side elevated perspective view of one exemplary embodiment of the invention showing a portable docking station comprising a ramp in a predefined default raised position.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.) Similarly, two or more items are "electrically associated" by bringing them together or into relationship with each other in any number of ways including: (a) a direct, indirect or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

This "Detailed Description" section of this document contains headers. Such headers are provided as place markers only for the convenience of the reader and are not to be used in the construction of this document.

While the particulars of the present invention and associated technology may be adapted for use with any type of apparatus for transferring items between a first point at a first elevation to a second point at a second elevation, the exemplary embodiments disclosed in this document related to a portable docking station suitably sized to fit in a typical parking space of a retail store.

Referring now to FIG. 1, a side elevated perspective view of one exemplary embodiment of the invention showing a portable docking station (PDS) (10) comprising a ramp in a predefined default raised position is presented. For this embodiment, a first end of a ramp body (12) is mechanically associated with a first ramp interface (14) while a second end of ramp body (12) is mechanically associated with a second ramp interface (16). First ramp interface (14) is further mechanically associated with a first end of lower frame (17). For the embodiment depicted in FIG. 1, ramp body (12) is defines a substantially flat plane and preferably constructed of light weight materials such as aluminum. The outer surface of Ramp body (12) may be configured with a nonskid surface for safety.

Figure 1B:
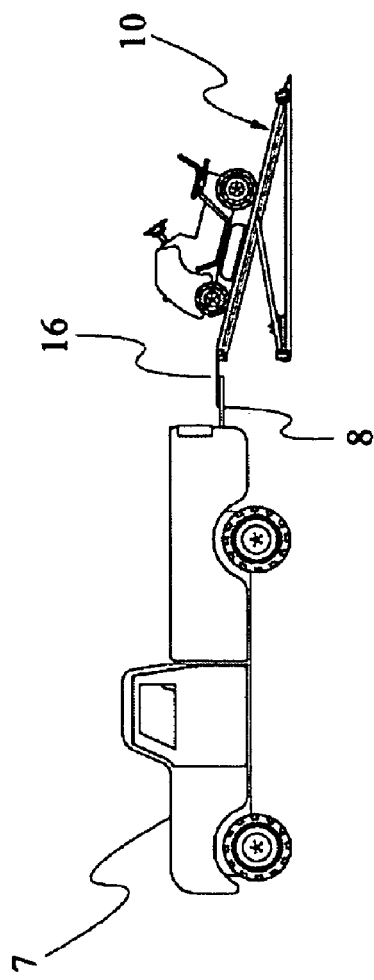
FIG. 1b is a side view of the invention depicted in FIG. 1 being used to load an item in a vehicle.
Figure 1C:
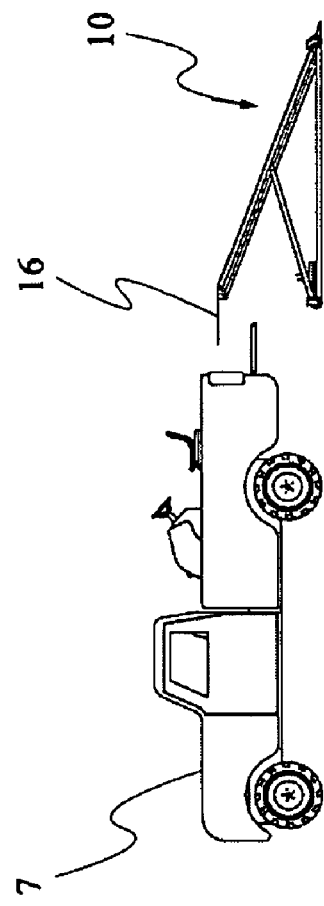
FIG. 1c is a side view of the invention depicted in FIG. 1 after being used to load an item in a vehicle.
Figure 2:
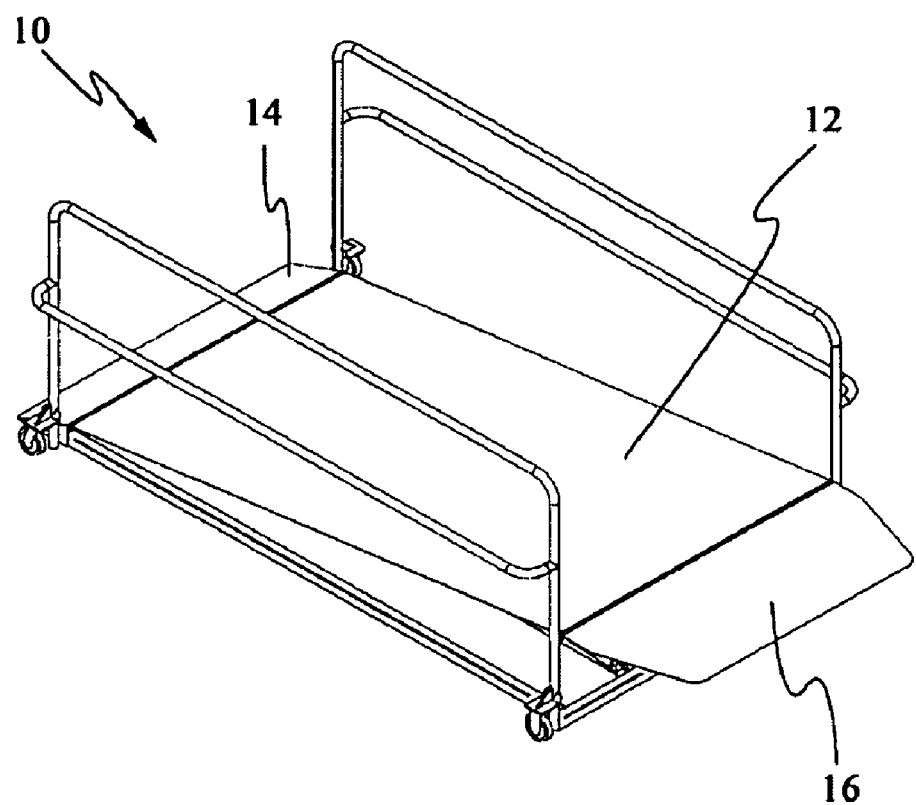
FIG. 2 is a side elevated perspective view of one exemplary embodiment of the invention showing a portable docking station comprising a ramp in a lowered position.
Figure 3:
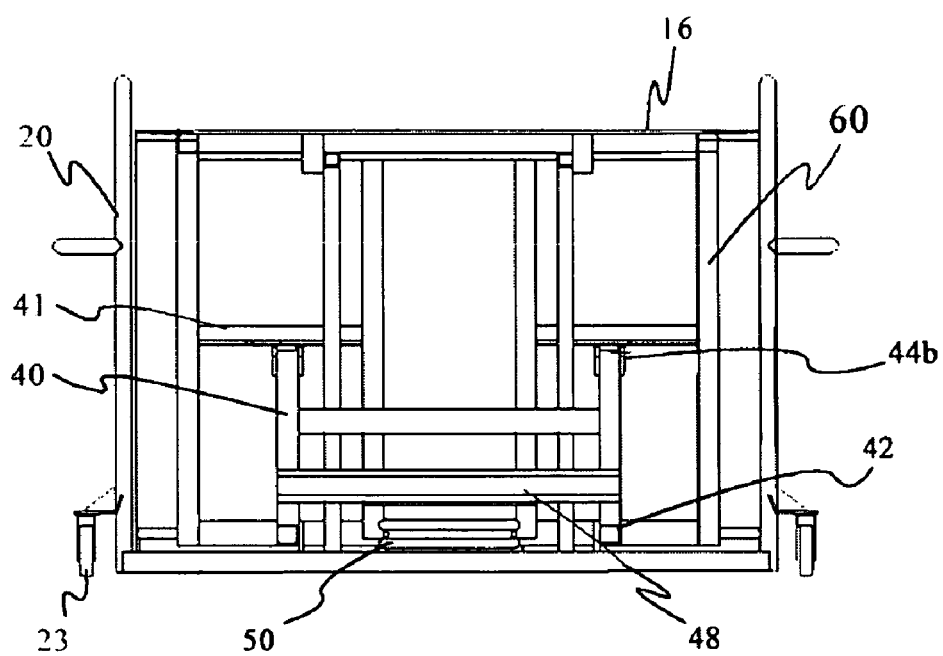
FIG. 3 is a front view of the portable docking station shown in FIG. 1.
Figure 4:
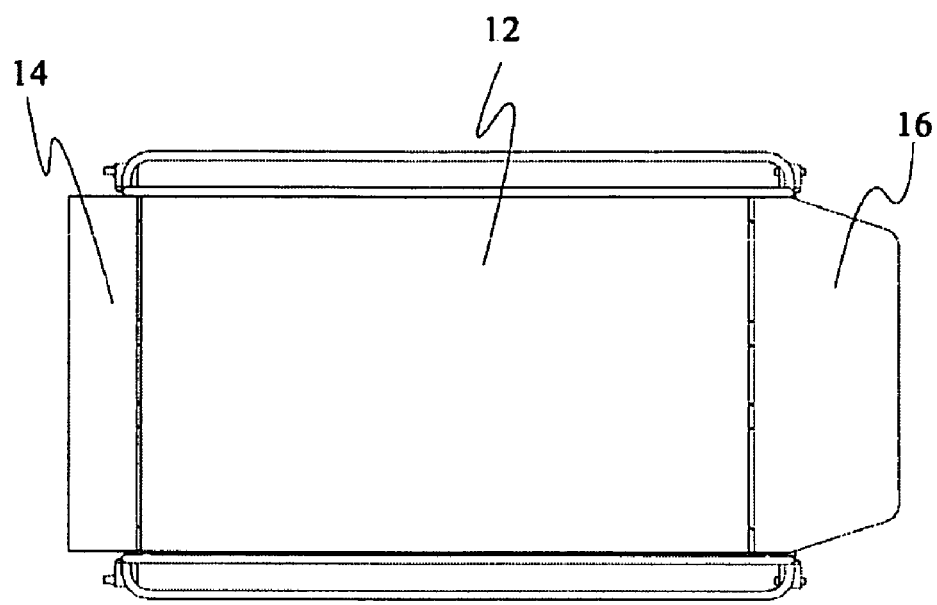
FIG. 4 is a top view of the portable docking station shown in FIG. 1.

FIG. 1*b* and FIG. 1*c* depict PDS (10) being used to transfer an item from a lower elevation (such as the surface of a parking lot) to the storage area of a vehicle (7) (the back of a truck). As the item moves up PDS (10), ramp body (12) lowers until ramp interface (16) comes in contact with a support surface (point of delivery) such as truck tailgate (8).

Figure 8:
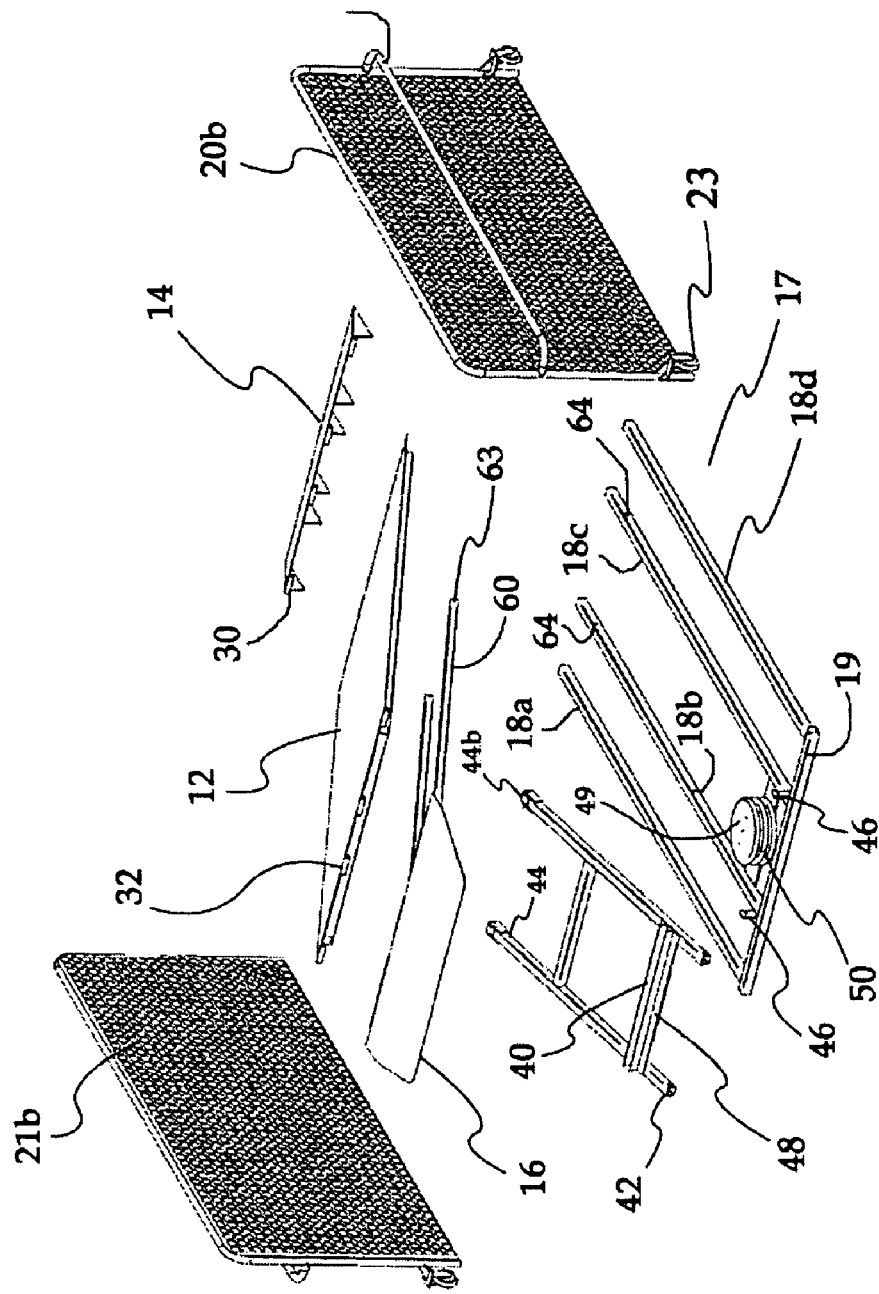
FIG. 8 is an exploded view of the docking station shown in FIG. 6.

As best seen in FIG. 8, lower frame (17) comprises a plurality of lower frame rails (18*a*-18*d*) running parallel respective to each other where one end of such rails is mechanically associated to cross rail (19). When first ramp interface (14) is mechanically associated with the opposing end of lower frame rails (18*a*-18*d*), a rigid lower frame is achieved. It should be appreciated that while four lower frame rails are used in the presently preferred embodiment any number of frame rails and cross rails may be used without departing from the scope and spirit of the invention. Preferably, first ramp interface (14) is pivotally associated with lower frame (17) so that it may be folded up when moving portable docking station (10) to prevent first ramp interface (14) from dragging on a support surface.

As depicted in the FIG. 1 exemplary embodiment, guard rails (20) are positioned on both sides of portable docking station (10). The left guard rail (20) is mechanically associated with the first end of lower frame rail (18*a*), extends upward and perpendicular from lower frame rail (18*a*) to a predefined height, then extends along a substantially parallel path (relative to frame rail (18*a*) to a point above a second end of lower frame rail (18*a*), extends down to and is mechanically associated with such second end. The right guard rail is configured in a similar manner.

Wheels (23) are mechanically associated with the four corners of lower frame (17). Wheels (23) facilitate the mobility of portable docking station (10). Wheels (23) may be adjustable so that when portable docking station (10) is in a desired position wheels (23) may be position so portable docking station (10) is not easily moved. In addition, such wheels (23) may be configured with a break as well be associated with a motor.

As best seen in FIG. 8, for the presently preferred embodiment, ramp body (12) is pivotally associated with first ramp interface (14) via hinge points (30). Similarly, ramp body (12) is pivotally associated with second ramp interface (16) via similar hinge points (32).

The portable docking station (10) further comprises a support linkage (40) configured to transfer a force to ramp body (12) that tend to support ramp body (12) or perhaps cause ramp body (12) to rise (depending on the DPS (10) configuration). A first end (42) of support linkage (40) is mechanically associated with lower frame (17) at anchor points (46). A second end (44) of support linkage (40) is configured with rollers (44*b*). Rollers (44*b*) are configured to interface with the underside of ramp body (12).

Support linkage (40) further comprises cross bar (48). Cross bar (48) is configured to interface with a surface (49) of force generator (50). Force generator (50) is disposed at the approximately at the mid point of cross rail (19) and between lower frame rail (18*b*) and (18*c*). A first surface of force generator (50) is mechanically associated with lower frame (17) while a second surface (49) is configured to interface with cross bar (48).

For the presently preferred embodiment, force generator (50) is a air spring, such as the ones manufactured by Goodyear®. It should be appreciated that any number of devices can be used as a force generator, including: motor driven shafts (such as ball screws), adjustable steel springs, a line and pulley system with counter weights, pneumatic and hydraulic cylinders, extension springs, gas shocks and any device that mechanically stores energy.

When the force generator (50) is a air spring, the air spring is configured to receive air that generates a force on second surface (49). Such force is transferred to cross bar (48) of support linkage (40) thereby further transferring the force to ramp body (12). When enough air is pumped into the air spring so that the upward force transferred to the under side of ramp body (12) is greater than the downward force generated by the ramp and items on the ramp, support linkage (40) pivots about first end (42) causing second end (44) to rise thereby causing ramp body (12) to rise.

For the presently preferred embodiment depicted in FIG. 1 and FIG. 8, the PDS (10) system uses a force generated by force generator (50) to simply support ramp body (12). For such embodiment, force generator (50) is adjusted so that ramp body (12) and associated second ramp interface (16) rises to a predefined default height when nothing is on ramp body (12). As weight is added to ramp body (12), ramp body (12) lowers until second ramp interface (16) interfaces with a point of delivery or ramp body (12) bottoms out (i.e. reaches the bottom of the device). A point of delivery may be any number of items including the bed of a truck, the bed of a trailer, and a surface such as a sidewalk or dock. When the added weight is removed from ramp body (12), ramp body (12) and second interface (16) automatically return to the predefined default height. For the present embodiment, the preferred minimum height is around sixteen inches above lower frame (17) and the maximum height is about 56 inches above lower frame (17).

Figure 5:
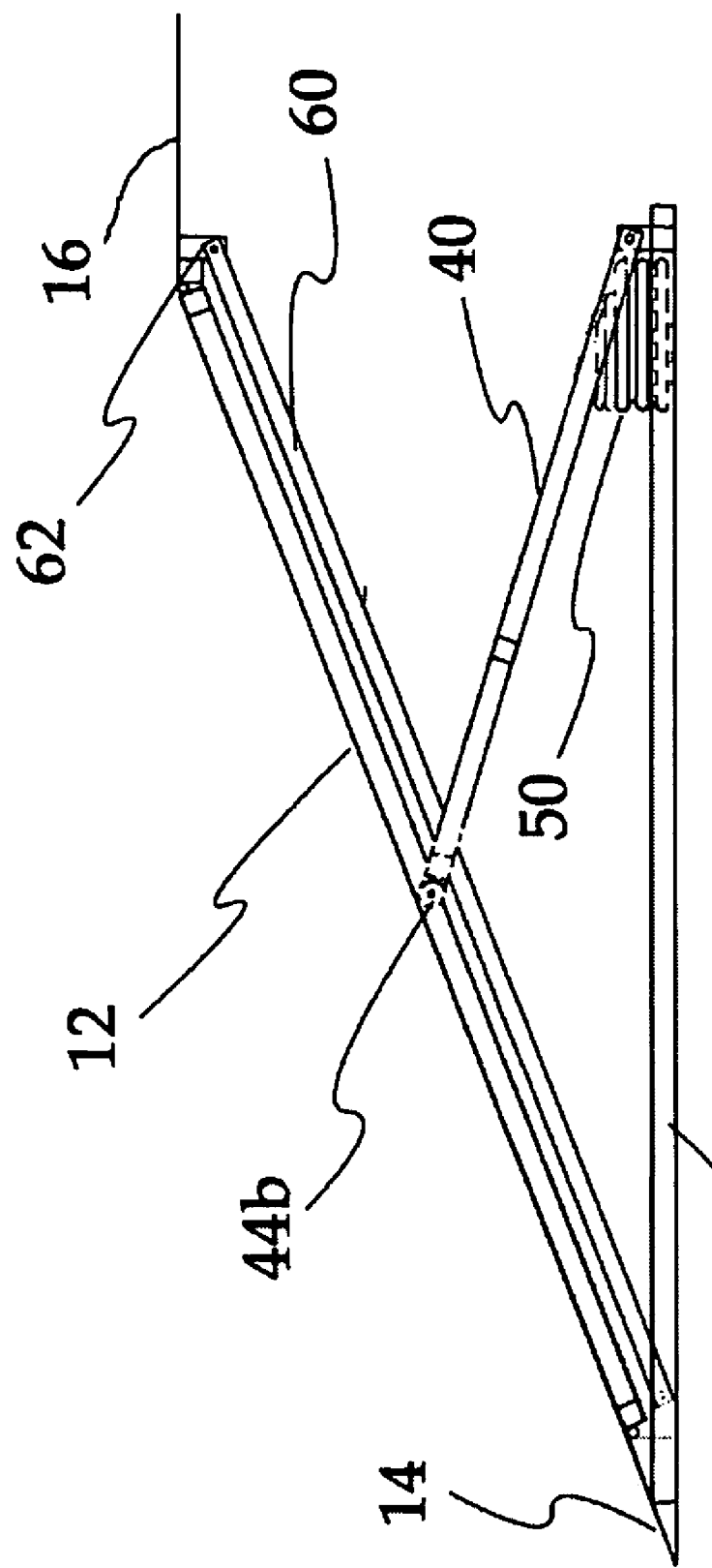
FIG. 5 is a side view of the portable docking station shown in FIG. 1 without side rails.
Figure 6:
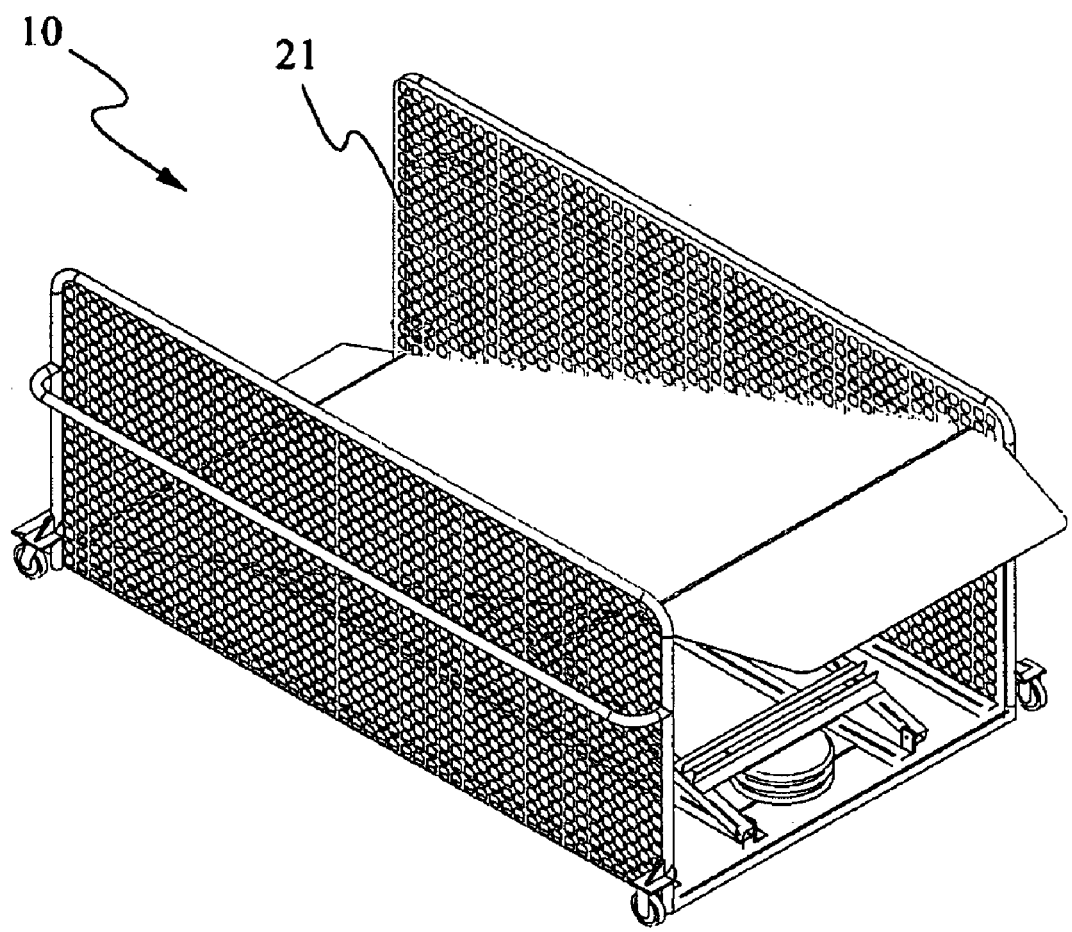
FIG. 6 is a view of the portable docking station shown in FIG. 1 further comprising additional safety rail features.
Figure 7:
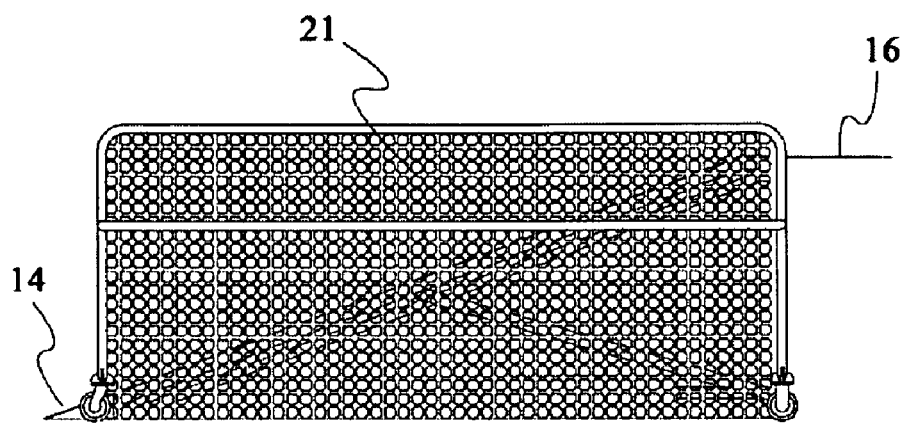
FIG. 7 is a side view of the portable docking station shown in FIG. 6.

Referring now to FIG. 5, one of ordinary skill in the art will appreciate that it is desirable for second interface (16) to remain parallel to lower frame (17) as ramp body (12) moves up and down. Portable docking station (12) includes horizontal stabilizer rails (60) to maintain second interface (16) in a substantially horizontal position relative to lower frame (17) as ramp body (12) and second interface (16) is raised and lowered. One end of horizontal stabilizer rails (60) are mechanically associated with lower frame (17) at points (64). The second end of horizontal stabilizer rails (60) are mechanically associated with points (62) of second interface (16).

It should be appreciated by one of ordinarily skill in the art that portable docking station (10) should be placed in position to transfer an item before the item is actually transferred. For example, assume the item to be transferred is a washing machine and the receiving surface is the bed of a truck. The first step in the transfer is to either move the receiving surface to portable docking station (10) or move portable docking station (10) to the receiving surface so that second ramp interface (16) is above the receiving surface. Next, the washing machine is moved along ramp body (12), which adds weight to ramp body (12). As the weight moves across ramp body (12), second ramp interface (16) lowers until second ramp interface (16) interfaces with the receiving surface. The washing machine is then transferred to the receiving surface. Once the added weight is off ramp body (12) and second ramp interface (16), ramp body (12) automatically returns to its predefined default height.

Lifting Feature

In one alternative embodiment, PDS (10) is configured with a lifting mode. For such an alternative embodiment, any number of devices can be used as a force generator, including: motor driven shafts (such as ball screws), a line and pulley system perhaps with using springs and/or counter weights, and pneumatic and hydraulic cylinders.

Preferably, when PDS (10) configured with a lifting mode, the default position of ramp body (12) is in the down position. An item to be transferred to a higher elevation is positioned on second ramp interface (16). An electronic module (described later) is then used to activate force generator (50) to position second ramp interface (16) above the receiving surface. The receiving surface is then properly positioned below second ramp interface (16). The added energy is released from the system until second ramp interface (16) interfaces with the receiving surface.

For such alternative embodiment, the PDS (10) may still be used as a traditional ramp system as described earlier. In yet another alternative embodiment, the PDS (10) may define a scissor lift system where both ends of the PDS (10) are raised keeping ramp body (12) substantially level. For such embodiment, force generator (50) activates a lifting surface that is disposed beneath and at the approximate center of the ramp body (12). For such a configuration, when one wishes to use PDS (10) in a ramp mode, ramp interface (16) is free to move while ramp interface (14) is secured and not allowed to move. When one wishes to use PDS (10) in a scissor lift mode, both ramp interface (16) and interface (14) are configured for movement.

Embodiments with Simple Lifting Features

Figure 9:
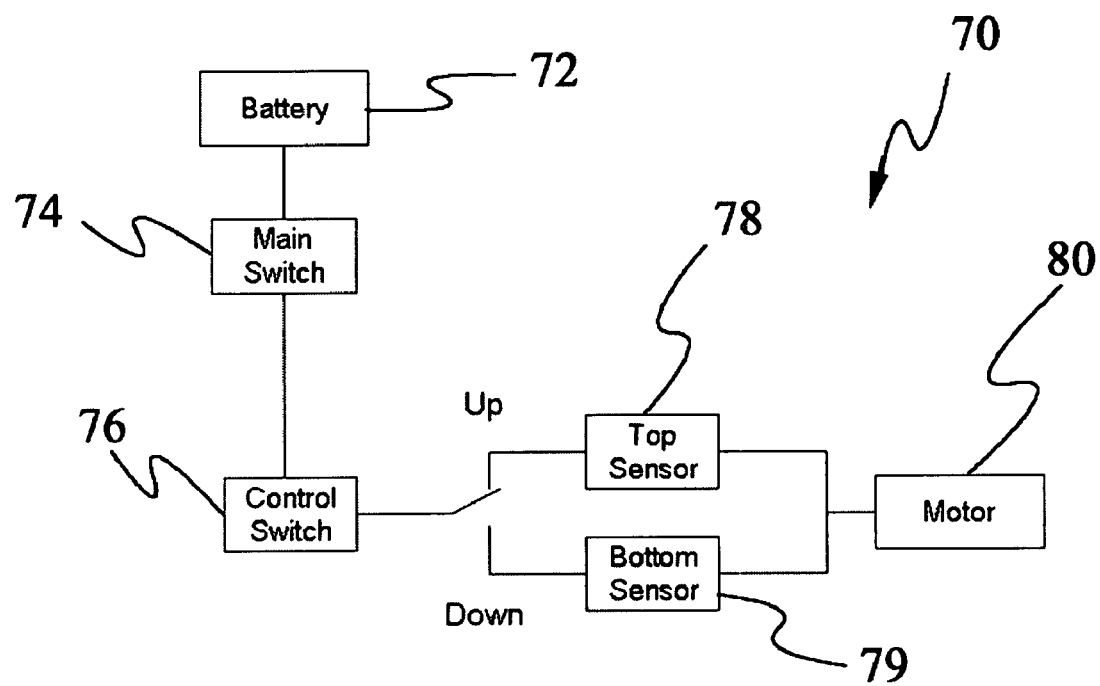
FIG. 9 is a block diagram representation of one exemplary control circuit for controlling motorized versions of the invention.
Figure 10:
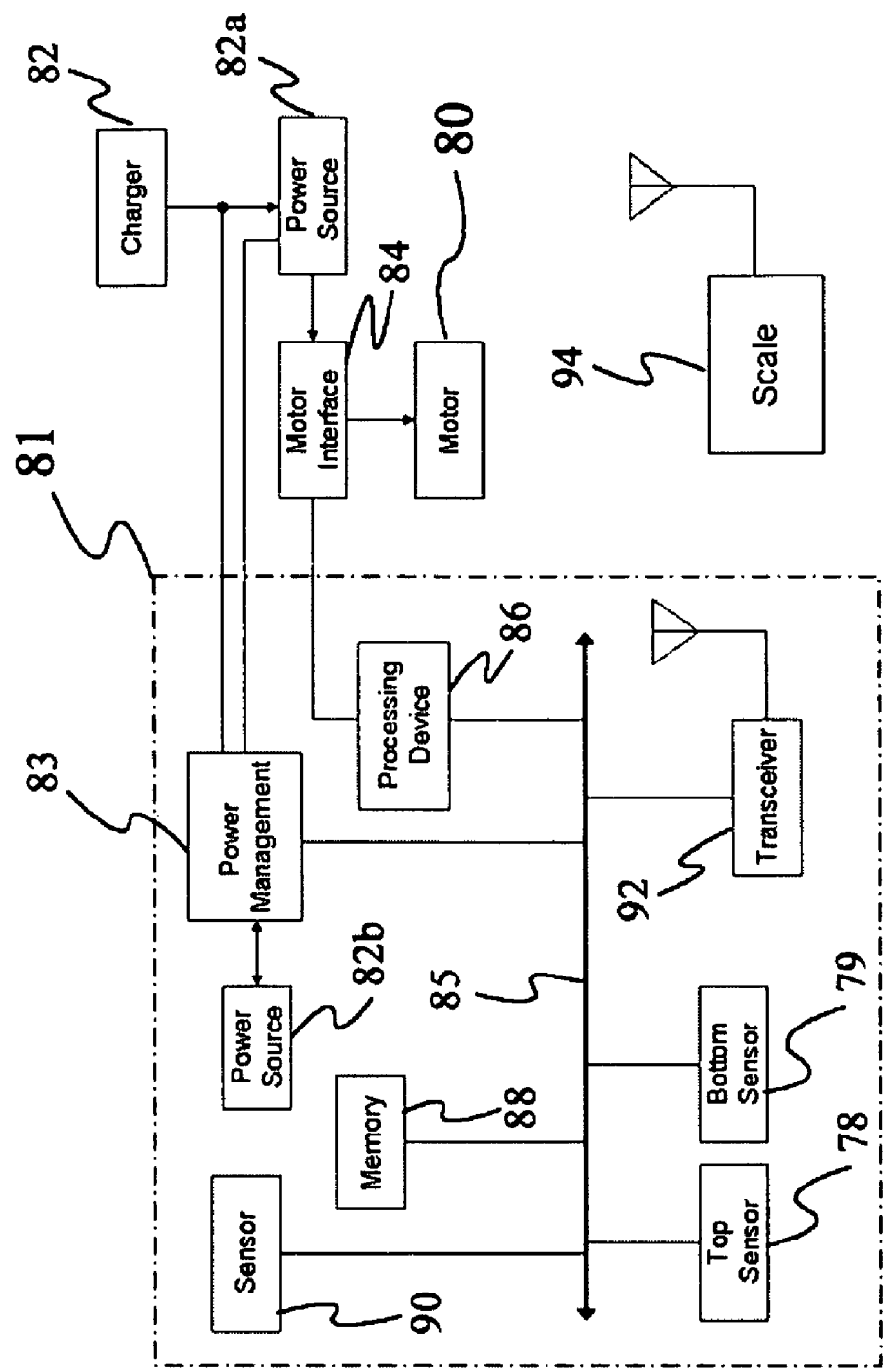
FIG. 10 is a block diagram representation of one exemplary control circuit comprising a weight measuring device and wireless communications features.
Figure 11:
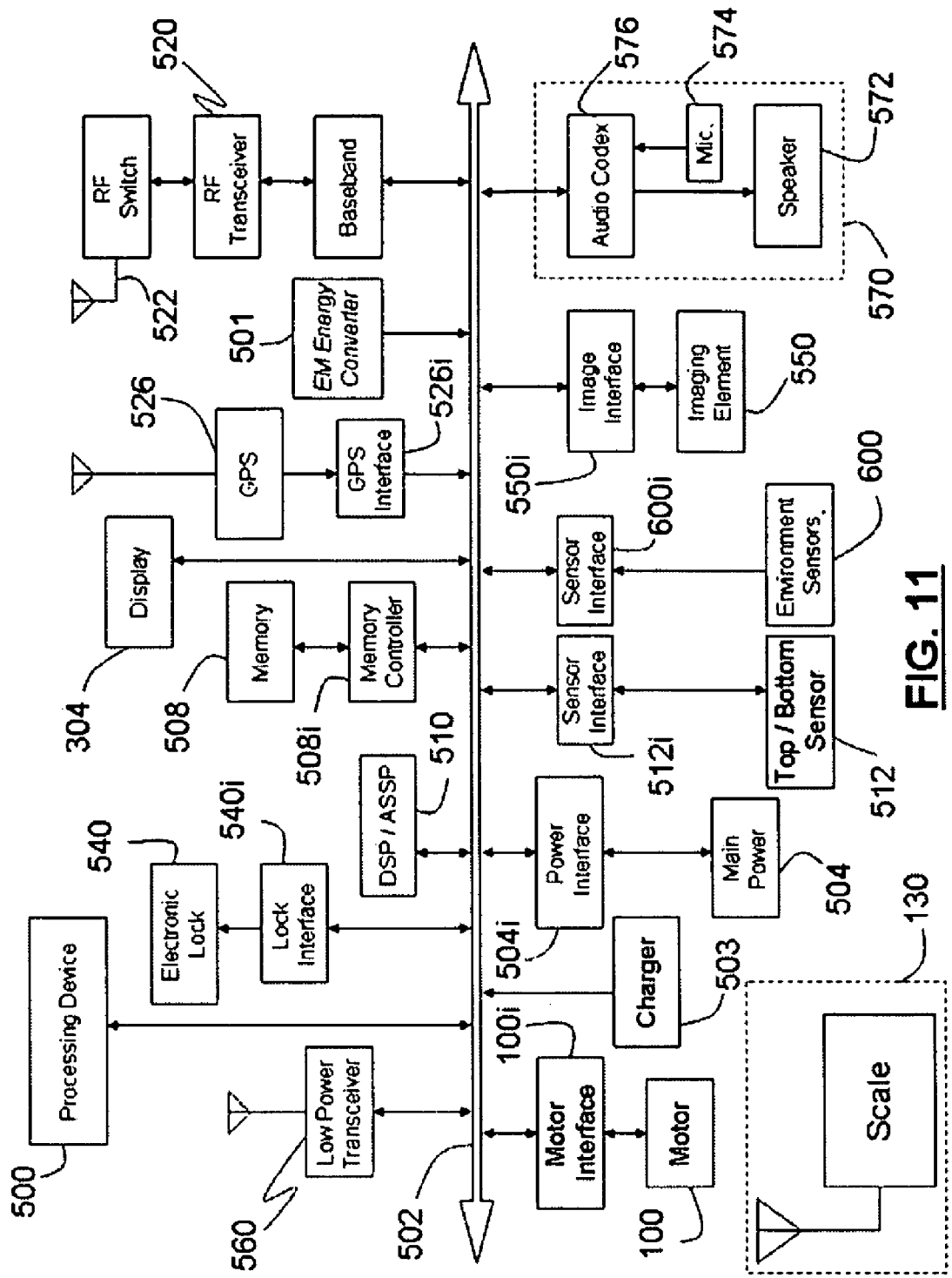
FIG. 11 is a block diagram representation of one alternative embodiment of a control system comprising communication features, security features, environment sensors, imaging components, audio components.

Referring now to FIG. 9, FIG. 10, and FIG. 11, it should be appreciated that an electronic module may be added to PDS (10) to form alternative embodiments of the invention. Several such electronic modules for controlling PDS (10) presented in FIG. 9, FIG. 10 and FIG. 11. Much of such electronic modules is explained in detail in commonly owned U.S. patent application 60/894,242 which is incorporated by this reference for all purposes.

For one alternative embodiment, an electric motor is used to raise and lower ramp body (16) and perhaps move PDS (10).

Referring now to FIG. 9, one exemplary control system (70) and power source (72) is presented. Power source (72) is electrically associated to a Motor (80) through main switch (74), control switch (76), a limit switches (78) and (79). Main switch (74) is preferably a current limiting switch such as a switch comprising a circuit breaker function. Power from main switch (72) is routed to controller switch (76). Controller switch (76) is configured with neutral, up, and down switch positions. Limit switch (78) prevents second ramp interface (16) from traveling in the up direction beyond a predefined maximum height. Limit switch (79) prevents ramp interface (16) from traveling in the down direction beyond a predefined minimum height. For the present exemplarily embodiment of the invention, the predefined maximum height and predefined minimum height are defined by positioning limit switch (78) and limit switch (79) as desired.

When controller switch (76) is placed in the neutral position, motor (80) is not activated. Assuming limit switch (78) is not actuated, when controller switch (76) is placed in the up position, power is applied to motor (80) so that it rotates a shaft in the direction that causes ramp interface (16) to rise until controller switch (76) is returned to the neutral position or limit switch (78) is actuated. Assuming limit switch (79) is not actuated, when controller switch (76) is placed in the down position, power is applied to motor (80) so that it rotates a shaft in the direction that causes ramp interface (16) to lower until controller switch (76) is returned to the neutral position or limit switch (79) is actuated.

Such a control system (70) may be further configured with various safety features. One safety feature relates to possible pinch points. To minimize or eliminate risk of "pinching" a body part between various PDS (10) components, the limit switches can be positioned to prevent ramp body (12) from rising to a point that would trap a body part in a possible pinch point.

Another safety feature would be to associate an object detector to the bottom of ramp interface (16). Examples of suitable object detectors are laser sensors, light sensors, heat sensors. Such a sensor would be configured to detect an object near the bottom of portable docking station (10) and prevent ramp interface (16) from lowering.

Embodiments with Electronic Features

Additional embodiments of the invention related to electronic modules that provide a variety of services including, lights to show position of ramp in dark environments. Such lights may be further configured to proved visual feedback to a user.

For the presently preferred embodiment, controller (81) comprising a processing device (86) configured to execute various software routines stored in onboard memory or memory (88) or both. The various elements of the system are connected via either a cable or a buss (85). Power source (82a) is electrically associated with motor (80) via power interface (84). Processing device (86) generates the necessary control signals that are transferred to power interface (84) which in turn applies power to motor (80) as required for the desired movement. Power source (82b) is an optional power source that can be used to supply power to controller (81) when external power source (82a) is not present.

Transceiver (92) is configured to receiving and transmitting information to a remote device. It should be appreciated, however, that embodiments of the invention where controller (81) comprises only a receiver or transmitter fall within the scope of the invention.

Sensor (90) may be a plurality of sensors configured to supply a variety of features. Sensor (90) may be a video sensor configure for remote monitoring by store personnel as well a person backing a vehicle toward portable docking station (10). For this embodiment, a video image of at least a portion of the docking station (10) (such as ramp interface (16) is transmitted to a remote receiver.

Sensor (90) may also comprise audio components m configured for providing warnings and recoding data in the area of the docking station.

Portable docking station (10) may further be configured with a ramp scale (94). Such a scale would be used to prevent overloading the ramp. Additionally, such a feature allows for documentation of the weight of items transferred via PDS (10) (inventory control). As noted above, sensor (90) may represent a variety of sensors configured to detect a plurality of events. An anti-theft system would be configured to notify the ramp owner when the ramp was being used. If the use was not authorized, the ramp owner would then investigate or remote disable the ramp.

A more detailed block diagram of a controller (99) configured to provide the various features is now examined.

Referring now to FIG. 13, one exemplary embodiment of the invention comprising an electronic module controller (99) configured for providing more advance electronic based features is presented. It should be recognized that such controller (99) may comprise a user interface comprising a plurality of physically separated but cooperatively associated electronic devices that are not shown independently such as a radiofrequency transmitter and receiver, a processor, one or more display means such as a LCD, a magnetic card reader, biosensor, an audio speaker, and the like, each communicating with or under control of the a central processing device. For the presently preferred embodiment, controller (99) defines at least one of a wired or wireless electrical association with a scale (130) mechanically associated with portable docking station (10). Controller (99) further comprises a user interface having a built-in visual display screen. For the preferred embodiment, the scale comprises a display for displaying information to a user such as power status, current weight data, and diagnostic status.

Block Diagram

Referring now to FIG. 13, a block diagram representation of the various electronic components of controller (99) is presented. Initially it should be appreciated that FIG. 13 presents just one of a plurality of methods of electrically associating the various electronic components to achieve the features desired. For example, FIG. 13 presents the use of a common buss (502) for electrically associating the various components. It should be appreciated that embodiments where certain devices are electrically associated with each other without the use of a buss fall within the scope of the invention. In addition, various embodiments of controller (99) may include all the features presented in FIG. 13, only a subset of subset of such features as well as features not specifically presented in FIG. 13.

For the preferred embodiment, the functional blocks of FIG. 13 represent ASSPs (Application Specific Standard Product), Complex Programmable Logic Devices (CPLD), ASICs (application specific integrated circuit), microprocessors, or PICs. In addition, one or more functional blocks may be integrated into a single device or chip sets such as ASSP chip sets. For example, one or more of the various interfaces described below may be integrated into (or have its described functions performed by) processing device (500).

Manufactures of suitable ASSP devices include Motorola, and Texas Instruments. While most of the functions are preferably performed by ASSP chip sets, Complex Programmable Logic Devices (CPLD) may be used to interface the various ASSP blocks to system buss (502) allowing one system component to interface with another component. Manufactures of suitable CPLD devices include Lattice's (ispMACH 4000 family) and (Altera's MAX 7000-series CPLD).

For the presently preferred embodiment of the invention, processing device (500) is configured to perform various tasks including data management, data storage, data transfers, resource monitoring, and system monitoring. Processing device (500) may be a simple PIC (such as the ones manufactured by MicroChip) or a relatively more complicated processor configured for use with standard operating systems and application software. Other technologies that may be used include ASICs (application specific integrated circuit) and ASSPs (application specific standard product). Processing device (500) may comprise onboard ROM, RAM, EPROM type memories. Processing device (500) is electrically associated with buss (502).

Buss (502) is configured for providing a communication path between the various electronic devices electrically associated with buss (502). For example, Buss (502) is configured for transferring data signals between processing device (500) and other electronic devices electrically associated with buss (502). For the preferred embodiment, bus (500) also comprises electrical paths for transferring power between main power (504), EM power converter (501) and other electronic devices electrically associated with buss (502). Buss (502) my further comprise a data port and or a power port configured for supplying/receiving power or providing a communication path to electronic devices electrically associated with such port.

Memory (508) is electrically associated with buss (502) via memory controller (508i). Memory (508) may be any type of memory suitable for storing data such as flash memory, SRAM memory, hard drive memory, as well as other types of memories. Volatile memory continuously connected to a power source may be used, although, for the preferred embodiment, memory (508) is nonvolatile memory. Memory (508) may be used for storing all types of data including application programs, image data, sound data, customer information, sensor data, and warning-criteria. Memory (508) is electrically associated with processing device (500) via memory controller (508i) and buss (502).

DSP/ASSP (510) is electrically associated to processing device (500) via buss (502). DSP (510) is configured to perform signal processing tasks such as voice, audio, video, encoding, decoding as well as other data and signal processing functions.

Display (304) is configured for displaying the various controller (99) data. Display (304) is electrically associated with buss (502) and may include technology for providing a customizable touch screen controller configured for control and decoding functions for display (304). For the preferred embodiment display (304) is a LCD display. Additionally, for one embodiment, display (304) comprises a "memory" configured to provide an image when power is removed from the display. For this embodiment, an image is written on the LCD display and when power is removed, the display will retain the image virtually indefinitely. Such a LCD display uses a technique developed by Zenithal Bistable Devices (ZBD), which adds a finely ridged grating to the inner glass surface of an LCD cell of Super-Twist-Nematic (STN) construction. As is known in the art the presence of the grating "latches" the polarization state of the liquid crystals and retains it when power is removed.

Controller (99) my further comprise a graphics accelerator that provides support for megapixel cameras and 3D graphics applications. One suitable graphics accelerator is the MQ2100 manufactured by MediaQ.

For the presently preferred embodiment, motor (100) is electrically associated with processing device (500) through motor interface (100i). Processing device (500) is configured to receive movement signals from control buttons associated with controller (99). Upon receiving movement signals, processing device (500) generates movement data that is transferred to motor interface (500i). Motor interface (500i) then causes motor (100) to move according to the received movement data. Processing device (500) is further configured to receive limit data generated by one of the Top/Bottom limit sensors (512). Limit sensors (512) are electrically associated with processing device (500) and/or motor interface (500i) through buss (502). If a limit sensor is activated, processing device (500) generates the appropriate movement data that is transferred to motor interface (500i) and ramp body (12) movement is stopped. It should be appreciated that embodiments where motor interface (500i) monitor limit sensors (512) and control buttons (320) and (322) fall with the scope of the invention.

Exemplary communication circuitry is now considered. For one embodiment, relatively long range wireless communication circuitry includes RF transceiver (520) configured to transmit and receive data signals to/from a remote electronic device. It should be noted that embodiments where such communication circuitry comprises only a transmitter or only a receiver fall within the scope of the invention. For one embodiment, transceiver (520) comprises a relatively low power transmitter that transmits a data signal in an unlicensed frequency band. Other embodiments include a relatively longer range transmitter comprising any number of well known technologies for wireless communications transmitting at any legal power level. For example, transceiver (520) may be configured to communicate over GPRS, GSM, GPRS, 3G, and EDGE enabled networks as well as WAP networks.

To facilitate remote access to the portable docking station (10), a networking system, such as a local area network (LAN) may be utilized. In this presently preferred embodiment, processing device (500) and memory (508) are configured to form a TCP/IP protocol suite and an HTTP (Hyper-Text Transfer Protocol) server to provide two-way access to the apparatus (10) data. Such TCP/IP protocols and HTTP server technology are well known in the art. For such an embodiment, controller (99) includes an HTTP server and a TCP/IP protocol stack. A gateway is provided that enables continuous remote access to the controller (99).

Generally speaking, a gateway may simply be a means for connecting two already compatible systems. Alternatively, a gateway may be a means for connecting two otherwise incompatible computer systems. For such an alternative configuration, the TCP/IP protocol suite may be incorporated into a gateway serving multiple controller (99) devices via a wired or wireless two-way network using, for example, Wireless Fidelity (Wi-Fi) technology. Such a gateway may incorporate an HTTP server for accessing data from multiple controller (99) devices and for transmission of data to individual user interface (10) devices.

In the above described TCP/IP enabled controller (99) system, a remote transceiver provides access to a first network operating in accordance with a predetermined protocol (TCP/IP is one example). A plurality of controller (99) devices may comprise a second network, such as a LAN. A gateway operatively couples the first network to the second network. Finally, an HTTP server is embedded in either the gateway or the plurality of portable docking station (10) facilitating the transfer of data between the two networks. With such a configuration, one of ordinary skill in the art will appreciate that individual portable docking station (10) or groups of portable docking station (10) devices may be accessed as if the portable docking station (10) were a web site and their information could be displayed on a web browser.

Portable docking station (10) may further be configured for storing and/or generating location data (312). For embodiments that generate location data, controller (99) includes a GPS device (526) electrically associated with processing device (500) via buss (502) and GSP Interface (526i). GPS (526) is one embodiment of a position-finder electrically associated with a processing device where GPS (526) is configured to generate position-data for the location of controller (99). For such configurations, processing device (500) is configured to use such position-data to retrieve customer information stored in memory (508). If the customer information exists for a current position-data location, such customer information is retrieved and the user is provided an opportunity to use such data for the activity of interest. If the customer information does not exist, processing device (500) is further configured to create a new customer file where such position-data. The new position-data may be associated with customer information for further reference. Similarly, if apparatus (10) can not be located (perhaps it was "borrowed"), processing device (500) is further configured to transmit a data signal using RF transceiver (500) at least one of random intervals, predefined cyclic intervals, and upon remote request.

The attributes of exemplary main power (504) are now considered. For the presently preferred embodiment, main power (504) is a long life depletable power source such as a Li Ion battery that is independent from power source (110). For such embodiment, main power (504) comprises at least one long life rechargeable Li Ion battery such as the ones manufactured by A123 Systems®. Alternatively, (504) may be electrically associated with power source (110) or may be replaced by power source (110).

Extending the life of main power (504) or extending the time between recharging is one design concern addressed by power interface (504i). Power Interface (500i) is configured to perform power management functions for the system as well as monitor the status of main power (504) and report such status to devices electrically associated with buss (502) (such as processing device (500)). Power interface (504i) dynamically addresses power management issues by selectively powering down unutilized devices. For the Preferred embodiment, power interface (504i) is a CPLD that generates chip-select signals and powers down the various ASSPs as desired. Alternatively, processing device (500) may perform such power management functions.

Electronic lock (540) is electrically associated with processing device (500) through lock interface (540i) and buss (502). For this embodiment, lock interface (540i) is an ASSP or CPLD device configured to change the state of electronic lock (540) in response to control signals received from processing device (500). Similarly, lock interface (540i) may be further configured to communicate the status of electronic lock (540) to devices electrically associated with buss (502). Electronic lock (540) may be a software lock that prevents access to various functions provided by portable docking station (10). In addition, electronic lock (540) may further be a mechanical lock that prevents wheels (23) ramp body (12) from moving.

Imaging element (550) is electrically associated with processing device (500) through image interface (550i) and buss (502). Imaging element (550) and image interface (550i) are configured for acquiring and transferring images to electronic devices electrically associated with buss (405). For the preferred embodiment, imaging interface (550i) is configured to support CMOS image input sensors such as the one manufactured by Micron® and/or CCD (charge-coupled device) image input sensors such as the ones manufactured by ATMEL® sensors. Imaging interface (550i) performs the necessary processing functions to convert the imaging data into a desired format before transferring such data to other devices associated with buss (502).

Low Power transceiver (560) would typically comprise a low power transmitter relative to transceiver (520). Low power transceiver (560) operates in an unlicensed band although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. Low power transceiver (550) is configured for short range communication with other suitably configured devices such as scale (130). As will be described below, one embodiment of the invention include a wireless scale (130) configured for transmitting scale data to processing device (500) via low power transceiver (560).

Attention now is directed to audio module (570). For the preferred embodiment, audio module (570) comprises speaker (572) and microphone (474) electrically associated with audio codex (576). Audio module (570) is configured for detecting sound waves and converting such waves into digital data of a predefined format such as MP3. Sound waves may also be generated by audio module (570) using speaker (572) to issue warnings and provide for other forms of communications. For example, audio module (570) may be used for voice communications between a person located at controller (99) and a person located at a remote site, using, for example, VoIP for the IP enabled systems describe earlier.

EM (electromagnetic) Energy Converter (501) is associated with a portion of the outer sides of controller (99). EM Energy Converter (501) is configured to convert electromagnetic energy (such as a radiated RF signal from a man made transmitter, sunlight, etc.) into a voltage for supplying power to system components and/or supplying energy to a power source. One well known EM Energy Converter is a photovoltaic cell.

Portable docking station (10) may further comprise a card reader, optional keyboard, and a biometric sensor (339). Such carder reader is preferably a standard magnetic strip reader or smart card reader well known in the art. Using such carder reader, customer information and payment information may be transferred to memory (508) or transmitted to a remote device using RF transceiver (520).

The Biometric sensor (339) is used to keep a customer's personal information secure using biometric identification. Biometric identification refers to the automatic identification of a person based on his/her physiological or behavioral characteristics. A biometric system is essentially a pattern recognition system which makes a personal identification by determining the authenticity of a specific physiological or behavioral characteristic possessed by a user. The biometric system may include, for example, a handwriting recognition system, a voice recognition system and fingerprint recognition.

For the preferred embodiment of the invention, biometric sensor (339) is a fingerprint scanner. For such embodiment of the invention, a user initially places a finger on biometric sensor (339). The biometric sensor scans the finger and transfers a digital representation of the user's fingerprint to memory (508). Such an initial bio sample is called an enrolment sample. After an enrolment sample has been stored in memory, future portable docking station (10) transactions are authorized by processing device (500) using biosensor data.

Attention is now directed to scale (130). Scale (130) is either a separate module mechanically associated PDS (10) to provide weight data in a user selectable format. Scale (130) comprises a wired or wireless communication connection with controller (99). Some embodiments of scale (130) may further complies a display (132) configured for displaying at least one of weight data, diagnostic data, battery status, and communication link status or any other desired information. Preferably, scale (130) includes an automatic shutoff when not in use for a predefined period of time. For one embodiment, a user presses a wakeup button associated with controller (99) and scale (130) wakes up and "zeros." An item is then placed on scale (130) and weight data is generated. Such data my be stored locally in scale (130) and/or transferred to controller (99).

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A portable docking station configured for transferring an item from a first elevation to a second elevation, said portable docking station comprising:
a lower frame comprising a plurality of lower frame rails running substantially parallel relative to each other, each lower frame rail defining a first frame rail end and a second frame rail end, wherein the second frame rail end for each lower frame rail is mechanically associated with a cross rail thereby defining a second lower frame end, and wherein the first frame rail end of each lower frame rail defines at least part of a first lower frame end;
a ramp body defining a predefined shape having a first ramp body end, a second ramp body end, a upper ramp body surface, and an opposing lower ramp body surface, wherein said first ramp body end is movably associated with said first lower frame end;
a ramp interface defining a predefined shape having a first ramp interface end, a second ramp interface end, a upper ramp interface surface, and an opposing lower ramp interface surface, wherein said first ramp interface end is movably associated with said second ramp body end;
a support linkage comprising a plurality of support linkage rails with each support linkage rail running substantially parallel relative to each other, said support linkage rails defining a first support linkage end and a second support linkage end, wherein said first support linkage end is movably associated with said second lower frame end and wherein the second support linkage end is configured for interfacing with said opposing lower ramp body surface;
wherein said support linkage further defines a support linkage interface disposed between the first support linkage end and the second support linkage end;
a force generator mechanically associated with said lower frame and positioned within said lower frame so that a surface of said force generator comes in contact with said support linkage interface, wherein said force generator generates an upward bias force that is transferred to said support linkage interface which in turn transfers at least a portion of such bias force to said ramp body, wherein said bias force is sufficient to cause said first ramp body end to pivot to a point that results in said ramp interface being elevated to a predefined height when no items are on said ramp body; and
wherein said first ramp body end pivots at said first lower frame end thereby lowering said ramp interface when weight is placed on said upper ramp body surface.

2. A portable docking station configured for transferring an item from a first elevation to a second elevation as in claim 1, wherein said ramp body defines a rectangular plate.

3. A portable docking station configured for transferring an item from a first elevation to a second elevation as in claim 1, wherein said force generator is an air spring.

4. A portable docking station configured for transferring an item from a first elevation to a second elevation as in claim 1, wherein said second support linkage end is configured with rollers suitable for interfacing with said opposing lower ramp body surface.

5. A portable docking station configured for transferring an item from a first elevation to a second elevation as in claim 1, further comprising horizontal stabilizer rails configured to maintain said ramp interface in a substantially horizontal position relative to the lower frame as said ramp body moves, wherein a first end of each horizontal stabilizer rail is movably mechanically associated with said first lower frame end and wherein a second end of each horizontal stabilizer rail is mechanically associated with said ramp interface.

6. A portable docking station configured for transferring an item from a first elevation to a second elevation as in claim 1, wherein said force generator is an electric motor.

7. A portable docking station configured for transferring an item from a first elevation to a second elevation as in claim 6, wherein said electric motor is electrically associated with a controller configured to automatically generate said bias force wherein such bias force places the ramp body in a predefined raised position until a predefined downward force is placed on said ramp body, and wherein said controller is further configured to detect said predefined downward force and cause said electric motor to lower said ramp body until said opposing lower ramp interface surface comes in contact with a loading surface when said predefined downward force is detected.

8. A portable docking station configured for transferring an item from a first elevation to a second elevation, said portable docking station comprising:
a lower frame comprising a plurality of lower frame rails running substantially parallel relative to each other, each lower frame rail defining a first frame rail end and a second frame rail end, wherein the second frame rail end for each lower frame rail is mechanically associated with a cross rail thereby defining a second lower frame end;
a first ramp interface mechanically associated with said first frame rail end for at least to lower frame rails;
a ramp body defining a predefined shape having a first ramp body end, a second ramp body end, a upper ramp body surface, and an opposing lower ramp body surface, wherein said first ramp body end is movably associated with at least one of (a) said first ramp interface, and (b) said first lower frame end;
a second ramp interface defining a predefined shape having a first ramp interface end, a second ramp interface end, a upper ramp interface surface, and an opposing lower ramp interface surface, wherein said first ramp interface end is movably associated with said second ramp body end;
a support linkage comprising a plurality of support linkage rails with each support linkage rail running substantially parallel relative to each other, said support linkage rails defining a first support linkage end and a second support linkage end, wherein said first support linkage end is movably associated with said second lower frame end and wherein the second support linkage end is configured for interfacing with said opposing lower ramp body surface;
wherein said support linkage further defines a support linkage interface disposed between the first support linkage end and the second support linkage end;
a force generator mechanically associated with said lower frame and positioned within said lower frame so that a surface of said force generator comes in contact with said support linkage interface, wherein said force generator is configured to generate an upward bias force that causes said ramp body to remain at a predefined elevated position until a predefined downward force is placed on said ramp body causing said ramp body to lower until (a) the opposing lower ramp interface surface of said second ramp interface comes in contact with a supporting surface capable of supporting a force equal to said downward force minus said bias force, and (b) said ramp body reaches the mechanical limits of downward movement.

9. A portable docking station configured for transferring an item from a first elevation to a second elevation as in claim 8, wherein said ramp body defines a rectangular plate.

10. A portable docking station configured for transferring an item from a first elevation to a second elevation as in claim 8, wherein said force generator is an air spring.

11. A portable docking station configured for transferring an item from a first elevation to a second elevation as in claim 10, wherein said air spring is configured with an input port suitable for allowing a gas to be transferred into said air spring thereby configuring said air spring to generate said upward bias force.

12. A portable docking station configured for transferring an item from a first elevation to a second elevation as in claim 11, further comprising horizontal stabilizer rails configured to maintain said ramp interface in a substantially horizontal position relative to the lower frame as said ramp body moves, wherein a first end of each horizontal stabilizer rail is movably mechanically associated with said first lower frame end and wherein a second end of each horizontal stabilizer rail is mechanically associated with said ramp interface.

13. A portable docking station configured for transferring an item from a first elevation to a second elevation as in claim 8, wherein said force generator is an electric motor.

14. A portable docking station configured for transferring an item from a first elevation to a second elevation as in claim 13, wherein said electric motor is electrically associated with a controller configured to automatically generate said bias force wherein such bias force places the ramp body in a predefined raised position until a predefined downward force is placed on said ramp body, and wherein said controller is further configured to detect said predefined downward force and cause said electric motor to lower said ramp body until said opposing lower ramp interface surface comes in contact with a loading surface capable of supporting said downward force minus said bias force.

15. A portable docking station configured for loading items onto a vehicle, said portable docking station comprising:
    a lower frame comprising a plurality of lower frame rails running substantially parallel relative to each other, each lower frame rail defining a first frame rail end and a second frame rail end, wherein the second frame rail end for each lower frame rail is mechanically associated with a cross rail thereby defining a second lower frame end;
    a first ramp interface mechanically associated with said first frame rail end for at least to lower frame rails;
    a ramp body defining a predefined shape having a first ramp body end, a second ramp body end, a upper ramp body surface, and an opposing lower ramp body surface, wherein said first ramp body end is movably associated with at least one of (a) said first ramp interface, and (b) said first lower frame end;
    a second ramp interface defining a predefined shape having a first ramp interface end, a second ramp interface end, a upper ramp interface surface, and an opposing lower ramp interface surface, wherein said first ramp interface end is movably associated with said second ramp body end;
    a support linkage comprising a plurality of support linkage rails with each support linkage rail running substantially parallel relative to each other, said support linkage rails defining a first support linkage end and a second support linkage end, wherein said first support linkage end is movably associated with said second lower frame end and wherein the second support linkage end is configured for interfacing with said opposing lower ramp body surface;
    wherein said support linkage further defines a support linkage interface disposed between the first support linkage end and the second support linkage end;
    a force generator mechanically associated with said lower frame and positioned within said lower frame so that a surface of said force generator comes in contact with said support linkage interface, wherein said force generator is configured to generate an upward bias force that causes said ramp body to remain at a predefined elevated position until a predefined downward force is placed on said ramp body causing said ramp body to lower until (a) the opposing lower ramp interface surface of said second ramp interface comes in contact with a supporting surface capable of supporting a force equal to said downward force minus said bias force, and (b) said ramp body reaches the mechanical limits of downward movement.

16. A portable docking station configured for loading items onto a vehicle as in claim 15, wherein said ramp body defines a rectangular plate having a width of about nine feet and wherein said force generator is an air spring.

17. A portable docking station configured for loading items onto a vehicle as in claim 16, wherein said air spring is configured with an input port suitable for allowing a gas to be transferred into said air spring thereby creating said bias force.

18. A portable docking station configured for loading items onto a vehicle as in claim 17, wherein said second ramp interface is suitably sized for being associated with the tailgate of a pickup truck.

19. A portable docking station configured for loading items onto a vehicle as in claim 18, further comprising an electronic sensor configured for detecting when said ramp body has dropped below said predefined elevated position.

20. A portable docking station configured for loading items onto a vehicle as in claim 19, wherein said electronic sensor is further configured to transmit a ramp-in-use signal when said ramp body has dropped below said predefined elevated position.

\* \* \* \* \*